Oct. 13, 1964  G. V. KRENIKOFF  3,152,601
FLUID PRESSURE REGULATING APPARATUS
Filed July 12, 1961
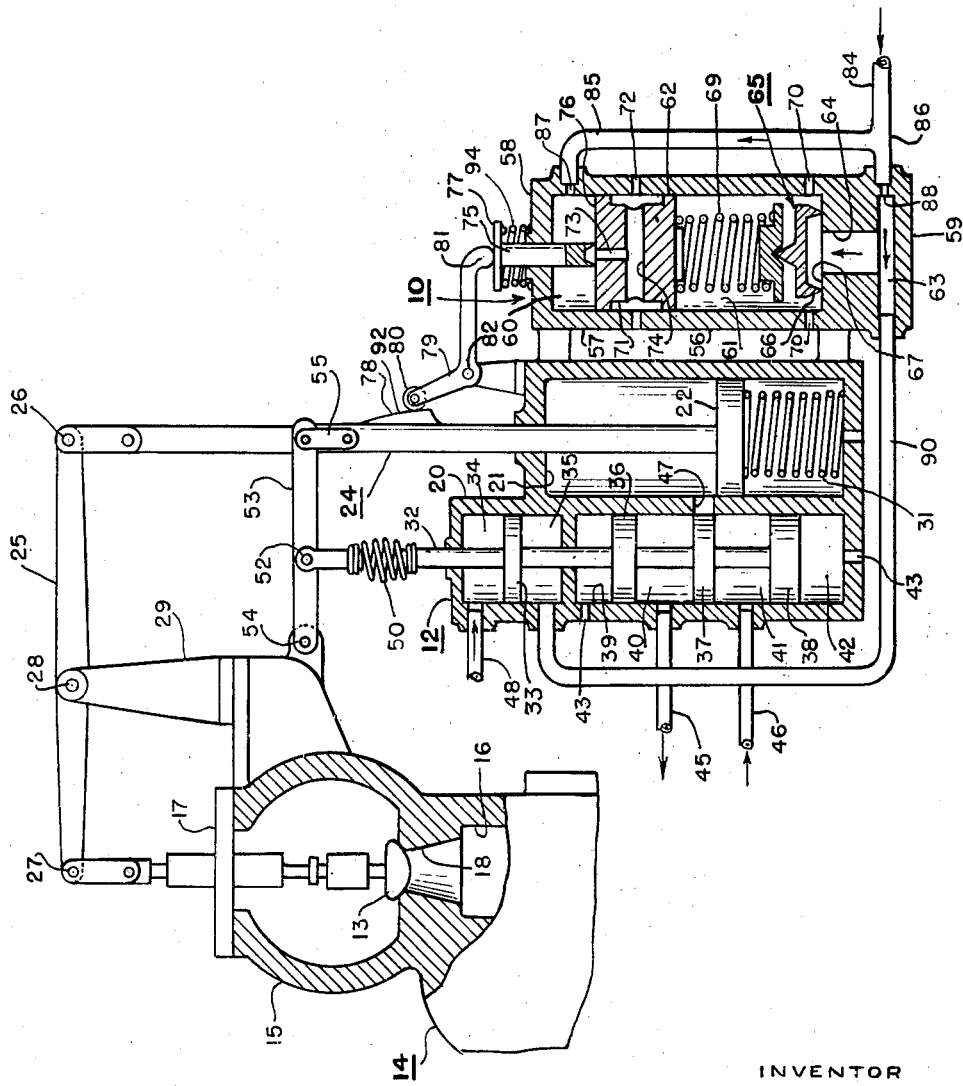
INVENTOR
GEORGE V. KRENIKOFF
BY

United States Patent Office 3,152,601
Patented Oct. 13, 1964

3,152,601
FLUID PRESSURE REGULATING APPARATUS
George V. Krenikoff, Swarthmore, Pa., assignor to Westinghouse Electric Corporation, East Pittsburgh, Pa., a corporation of Pennsylvania
Filed July 12, 1961, Ser. No. 123,575
6 Claims. (Cl. 137—36)

This invention relates to fluid pressure regulating apparatus and has for an object to provide an improved device of this character.

Another object of the invention is to provide a fluid pressure regulator that is highly sensitive in nature and that is adjustable to provide any desired fluid pressure signal within its operating range with only a small amount of mechanical force application.

A further object is to provide a fluid pressure regulating device of the above type having a cup valve for bleeding the excess fluid pressure to the degree required to provide a reduced fluid pressure signal and in which the cup valve is regulated by a fluid pressure control device.

Yet another object of the invention is to provide a servomotor having an actuating piston controlled by the differential between two fluid pressure signals, and a pressure regulating device of the above type for providing one of the pressure signals in a manner to modify the value of the other pressure signal and thereby modify the movement of the actuating piston.

In accordance with the invention, there is provided a fluid pressure regulating device having a cup valve disposed in covering relation with a first port and biased against said port by spring means interposed between the cup valve and a movable abutment such as a piston slidably received in a cylinder. Pressurized fluid from a suitable source is directed through the first port against the cup valve and bled therepast as dictated by the spring force on the cup valve. The resultant fluid pressure at a lower and regulated value is employed as a signal for controlling other apparatus such as a fluid actuated servomotor. The piston divides the cylinder into two compartments, the cup valve being disposed in the first compartment and a pilot valve being disposed in the second compartment in covering relation with a second port. Pressurized fluid is also admitted to the second compartment and is effective to exert a pressure on the piston which modifies the spring bias on the cup valve in accordance with the position of the pilot valve. The pilot valve is positioned by cam and follower mechanism or other suitable adjusting device.

During operation, with pressurized fluid being admitted to the second compartment and the cup valve, and the pilot valve in a position corresponding to the position of the follower on the cam, pressurized fluid is bled past the cup valve at a prescribed rate to provide a reduced fluid pressure signal that is determined by the pilot valve position. When the pilot valve is moved toward the relay piston, fluid pressure in the second compartment increases momentarily to urge the piston away from the pilot valve in a direction to compress the spring, thereby increasing the spring bias on the cup valve and reducing the leakage of fluid past the cup valve, and increasing the fluid pressure signal. When the pressure regulating device is stabilized, some pressurized fluid flows through the second port to maintain the relay piston in a set position.

To reduce the pressure signal, the cam is moved to a position in which the pilot valve is permitted to move away from its associated port. The momentary increase in flow past the pilot valve and through its port causes the relay piston to move toward the pilot valve with a following action, thereby decreasing the bias on the cup valve so that an increased amount of fluid is bled past the cup valve and the fluid pressure signal is thus reduced.

Since the pilot valve is effective to momentarily block or unblock the first port during transitory movement, only a small force is required to position the pilot valve and substantially all of the force required to maintain the relay piston in a selected position is provided by the pressurized fluid in the first compartment.

The fluid pressure signal attained by the fluid pressure regulating device is directed to a fluid actuated servomotor of the type having an actuating piston disposed within a cylinder and having a movable abutment movable in response to the difference in pressure between the fluid pressure signal from the pressure regulating device and a second pressure signal, thereby to admit or exhaust high pressure fluid from the actuating piston cylinder. The operation of the actuating piston is thus controlled to regulate the movement of a fluid flow control valve, such as a steam inlet valve for a steam turbine.

The cam is operatively associated with the actuating piston and movable thereby to position the pilot valve on the pressure regulating device as previously described. The cam may assume any shape as required to provide a desired first fluid pressure signal.

As well known in the art, the mass steam flow (lbs. per min.) through the steam inlet valve of a turbine is not a rectilinear function of the movement of the steam inlet valve, while the mass steam flow required for motivating the turbine is a rectilinear function of load on the turbine. However, the control fluid pressure employed to actuate the servomotor for load regulation on steam turbines is a rectilinear function of the rotational speed of the turbine.

Accordingly, the cam is so shaped that the fluid pressure signal from the pressure regulating device is non-rectilinear and effectively modifies the speed controlled pressure signal in such a manner that the steam inlet valve movement provides mass steam flow to the turbine as a rectilinear function of the difference in pressure between the two pressure signals, thereby providing speed-load regulation of the steam turbine that is rectilinear.

Yet another object of the invention is to provide a pressure regulating device of the above type which, although employing a cam and follower is arranged in such a manner that the cam is very lightly loaded at all times, the loading on the cam being the nominal value of the usual friction and weight of the parts actuated by the cam, such as the pilot valve, the follower and the relay piston, etc.

The foregoing and other objects are effected by the invention as will be apparent from the following description taken in connection with the accompanying drawing, forming a part of this application, in which:

The sole figure is a sectional view of a device incorporating the invention and associated with a steam turbine, only a fragmentary portion of the steam turbine being shown.

Referring to the drawing in detail, there is shown control apparatus including a fluid pressure regulating device 10, associated with a fluid pressure responsive device such as a servomotor 12 for regulating a steam inlet valve 13 of a steam turbine 14. The steam turbine 14 is only partially shown, since it may be of any conventional type in which motivating steam is admitted through a steam chest 15 and regulated by the steam inlet valve 13 before delivery to a nozzle chamber 16, as required to drive the turbine rotor (not shown). As well known in the art, the turbine 14 may be employed to drive an electrical generator or the like (not shown), hence speed regulation under varying load on the generator must be accurately controlled.

The steam inlet valve 13 is slidably mounted in a suitable support structure 17 for axial positioning with relation to its associated port 18, thereby to regulate flow of steam from the steam chest 15 into the nozzle chamber 16 as required to motivate the turbine with varying load requirements. In the position shown, the steam inlet valve 13 blocks the port 18, however, upon axial movement in upward direction the valve 13 unblocks the port 18.

The servomotor 12 is employed to operate the steam inlet valve 13 and is provided with a housing 20 having a cylindrical bore 21 within which is slidably disposed an actuating piston 22 having an actuating rod 24 extending through the housing 20 and connected to the steam inlet valve 13 by a beam 25 pivotally connected at its ends 26 and 27 to the actuating rod 24 and the valve 13, respectively. The beam 25 is fulcrumed intermediate its end portions as indicated at 28 upon a support 29, rigidly supported by the steam chest 15.

In the example shown, the actuating piston 22 is biased upwardly or in valve closing direction by a compression spring 31, but is movable downwardly against the bias of the spring 31 to move the valve 13 in opening direction.

The servomotor 12 further includes a pressure responsive device including a multiple piston structure or "spool" 32 having a first piston portion 33 disposed in a cylinder divided into upper and lower compartments 34 and 35 thereby, and second, third and fourth axially aligned piston portions 36, 37 and 38, respectively, disposed in a cylinder and divided thereby into compartments 39, 40, 41 and 42, respectively. Compartments 39 and 42 are vented to the atmosphere by suitable apertures 43, while compartment 40 is connected to a suitable drain by the conduit 45. Compartment 41 is connected to a suitable source of high pressure fluid (for example, hydraulic fluid such as oil) by a conduit 46, while the cylinder 21, within which the actuating piston 22 is disposed, is provided with a port 47. The port 47 is controlled by the piston portion 37 in a manner to admit high pressure fluid from chamber 41 to the bore 21 to force the actuating piston 22 downwardly, or to exhaust fluid therefrom through compartment 40 to the drain conduit 45 to permit the actuating piston 22 to move upwardly, as required to control the position of the steam inlet valve 13.

The upper compartment 34 is connected by a suitable conduit 48 to a source of regulated pressurized fluid (hereafter called a first pressure signal). Hence, the spool 32 is movable axially in response to the value of the first pressure signal to admit or exhaust fluid from the bore 21, as mentioned above. The first pressure signal may be provided by suitable apparatus (not shown) responsive to the rotational speed of the turbine 14, and, as well known in the art, varies as a rectilinear function of the rotational speed of the turbine, that is, the pressure signal value increases uniformly with increase in speed. Also, a suitable restoring force is applied to the spool 32 by a "scale" spring member 50 connected at one end to the spool 32 and pivoted at its opposite end by a pivot 52 to a link 53. The link 53 may be connected at one end 54 to the steam chest 15 and at its opposite end to the actuating rod 24 through an intermediate pivotally connected link 55.

As thus far described, the apparatus is substantially conventional and operates in the following manner. When the first pressure signal is indicative of lower turbine speed than required, the pressure in upper compartment 34 is overcome by the spring force of the scale spring 50 with accompanying upward movement of the spool 32 and its piston portion 37, thereby uncovering the port 47 and permitting high pressure fluid to flow from compartment 41 into the bore 21. As high pressure fluid enters the bore 21, the actuating piston 22 is urged downwardly with resulting upward movement of the steam inlet valve 13. As the steam inlet valve 13 moves in opening direction, the mass steam flow rate to the turbine 14 is increased, thereby causing the turbine to tend to accelerate. As the turbine accelerates, the first pressure signal increases in response thereto and overcomes the bias effect of the scale spring 50, thereby moving the piston 37 downwardly and restricting the supply of high pressure oil to the bore 21. During such transitory movement, the piston 37 may move downwardly to a larger degree than required, thereby momentarily exhausting some of the high pressure fluid from the bore 21 and directing it to drain through the compartment 40 and drain conduit 45, until stabilization is attained.

The mass flow rate (lbs. per min.) through the steam inlet valve 13 is a nonrectilinear function of movement of the valve, that is, upon an initial movement of predetermined length a certain quantity of steam flows through the port 18, but as the valve member 13 is moved in further opening direction in additional increments of uniform length, the mass flow-through the port 18 increases at a slower rate. On the other hand, the first pressure signal varies uniformly with change in speed so that it is a rectilinear function of speed. Hence, it is desirable to modify the movement of the actuating piston 22 in such a manner that its movement varies nonrectilinearly with regard to the value of the first pressure signal, thereby to more precisely position the steam inlet valve 13 and render the mass flow of steam through the port 18 a rectilinear function of the first pressure signal.

In accordance with the invention, the fluid pressure regulating device 10 is provided for modifying the force imposed by the first pressure signal on the spool 32, in a manner now to be described, so that the movement of the actuating piston 22 varies nonrectilinearly with the first pressure signal.

The fluid pressure regulating device 10 includes wall structure 56 having a cylindrical wall portion 57 and upper and lower end wall portions 58 and 59 jointly defining a chamber divided into upper and lower compartments 60 and 61 by a relay piston 62 slidably disposed therein. The lower wall portion 59 is provided with an enlarged cavity 63 communicating with the lower compartment 61 by way of a port 64.

A cup valve 65 is disposed within the lower compartment 61 in covering relation with the port 64. As illustrated, the cup valve 65 is provided with an annular knife-edge lip 66 encompassing the port 64 and disposed in abutting relation with an internal surface portion 67 of the lower wall portion 59. A compression spring member 69 is interposed between the relay piston 62 and the cup valve 65, thereby biasing the relay piston and the cup valve in opposite axial directions. The lower compartment 61 is vented to atmosphere by suitable apertures 70.

The relay piston 62 is provided with an annular recess 71 disposed in continuous fluid communication with the atmosphere by way of suitable apertures 72 and is further provided with a port 73 disposed in communication with the upper compartment 60 and connected to the annular recess 71 by an internal transverse passage 74.

A pilot valve 75 slidably received in the upper end wall portion 58 and extending into the upper compartment 60 is provided with a circumferential knife-edge lip disposed in abutable relation with the upper surface 76 of the relay in blocking relation with the port 73. The pilot valve 75 has an externally disposed end portion 77 disposed normal to its axis and of larger diameter than the main body thereof. The pilot valve 75 is freely movable in axial direction and may be positioned by any suitable mechanism cooperatively associated with the actuating rod 24, for example, a cam member 78 and follower member 79. As illustrated, the follower member 79 is a bell-crank and has one end portion 80 disposed in slidable abutment with the cam member 78 and its other end portion 81 in axial abutment with the valve end portion 77, and is pivotally mounted intermediate its end portions as indicated at 82.

The cam member 78 is carried by the actuating rod 24 of the piston 22. Hence, as the piston 22 is translated axially, the pilot valve 75 is actuated by the cam follower 79.

Pressurized fluid, such as oil or other fluid, is admitted to the upper compartment 60 and into the cavity 63 by suitable conduit structure 84 having branches 85 and 86. The branch 85 directs the pressurized fluid into the upper compartment 60 through a restricting orifice 87, while the branch 86 admits the pressurized fluid to the cavity 63 through a restricting orifice 88.

The fluid pressure regulating device 10 further includes conduit structure 90 disposed in joint communication with the cavity 63 and the port 64 at one end, and in communication with the fluid compartment 35 of the servomotor at its other end.

During operation, with pressurized fluid in the upper compartment 60 and in the lower cavity 63, the relay piston 62 is movable downwardly by the fluid pressure in compartment 60 sufficiently to unseat the pilot valve 75, thereby bleeding some of the excess pressure through the port 73 to atmosphere through the apertures 72 until pressure stabilization occurs. Similarly, the cup valve 65 is urged in upward direction by the pressurized fluid in the port 64, thereby becoming unseated to the degree required for stabilization and permitting the excess fluid pressure to bleed to atmosphere through the apertures 70. The resulting fluid pressure effective in conduit 90 is a controlled or regulated pressure, hereinafter called a second pressure signal.

To increase the value of the second pressure signal, the pilot valve 75 is moved downwardly and during such movement momentarily blocks the port 73 with a resulting build-up in fluid pressure in compartment 60 and downward movement of the relay piston 62 by fluid pressure exerted therein. As the relay piston 62 is urged downwardly, the spring member 69 is further compressed and increases its bias against the cup valve 65. The cup valve 65 under these conditions requires a larger unseating force than heretofore, so that less fluid is bled therepast through the apertures 70 and the resulting second pressure signal in conduit 90 increases in value.

To reduce the value of the second pressure signal, the pilot valve 75 is permitted to move upwardly to another position, thereby momentarily uncovering the port 73 and reducing the fluid pressure in compartment 60. Hence, the relay piston 62 will move upwardly with a following action until pressure stabilization is attained. Concomitantly therewith, the compression spring member 69 is relaxed, thereby reducing its bias effect on the cup valve 65. Accordingly, the cup valve now has less resistance to upward movement by the fluid pressure in cavity 63 and orifice 64, so that fluid at an increased rate is bled to the atmosphere through the apertures 70 with a resultant decrease in the second pressure signal in conduit 90.

The pilot valve 75 is positioned, as described above, by the cam follower 79 as it rides over the surface of the cam member 78. In the embodiment shown, the cam member 78 has a curved surface 92 having its largest throw at the bottom and diminishing in throw nonuniformly in upward direction. Hence, during initial movement of the actuating rod 24 the cam follower 79 is in the portion of largest throw on the cam 78 and its end portion 81 is in its lowermost position, thereby positioning the pilot valve 75 in its lowermost position. Under such conditions, the resistance of the cup valve 65 to unseating is relatively large. Hence, the value of the second pressure signal effective in conduit 90 is relatively high. Accordingly, during initial opening of the steam inlet valve 13 by the servomotor 12 the first pressure signal in the upper compartment 34 is opposed by a relatively high second pressure signal, thereby retarding the downward movement of the actuating piston 22 with concomitant retarded movement of the steam inlet valve 13 in opening direction. As the load on the turbine is increased, the value of the first pressure signal increases, thereby requiring the steam inlet valve 13 to move in further opening direction under the control of the actuating rod 24. As the actuating rod 24 moves further downwardly, the cam follower 79 will rotate counterclockwise, as dictated by the portion of the cam 78 on which it now rides, thereby permitting the pilot valve 75 to move upwardly. As the pilot valve 75 moves upwardly to its new position, the relay piston 62 moves upwardly with a following action, as heretofore described, and the cup valve 65 is now effective to reduce the value of the second pressure signal in conduit 90. Accordingly, the first fluid signal in conduit 34 is now opposed by a second signal of lower value, so that the actuating rod 24 is now moved downwardly to a larger degree than heretofore, thereby accelerating the rate of opening movement of the valve 13.

From the above it will be seen that the fluid pressure regulating device 10 is effective to provide a second fluid signal that opposes the value of the first fluid signal in such a manner that the differential between the two is a nonrectilinear function of the rotational speed of the turbine 14. Accordingly, the steam inlet valve 13 is controlled in such a manner that the mass flow of steam therethrough varies directly with the speed of the turbine, so that speed-load regulation of the turbine is rectilinear in nature and may be precisely controlled.

The pilot valve 75 is lightly loaded at all times and merely serves to momentarily increase the release of fluid from the upper compartment 60 through the port 73 when moved in upward direction or to momentarily decrease the release of fluid when moved in downward direction. Hence, the force exerted by the cam follower 79 in positioning the pilot valve 75 is of a very small order determined by the weight of the various components such as the cam follower 79, the pilot valve 75 and the relay 62, as well as the small but unavoidable friction of these components during movement. Accordingly, in the embodiment shown, a light compression spring member 94 is interposed between the end portion 77 of the pilot valve and the upper end wall 58. This spring should be, at least, sufficiently strong to maintain the pilot valve 75 against the cam follower 79 and the cam follower 79 against the cam 78.

Although the fluid pressure regulator 10 has been described in conjunction with a servomotor for positioning the steam inlet valve on a steam turbine, it may be advantageously employed wherever a closely controlled fluid pressure signal of high sensitivity and infinitely variable within its range is required. The fluid pressure signal provided by the regulator 10 may be varied in any manner desired by suitably positioning the pilot valve 75. In the example shown and described, this may be attained by modifying the contour or surface 92 of the cam member 78.

While the invention has been shown in but one form, it will be obvious to those skilled in the art that it is not so limited, but is susceptible of various changes and modifications without departing from the spirit thereof.

What is claimed is:

1. A pressure regulating device comprising a wall structure having an internal cylindrical chamber, a relay piston slidably disposed in said chamber and dividing said chamber into first and second compartments, said wall structure further defining a cavity, first conduit structure disposed in always open communication with said first compartment and said cavity for jointly admitting a pressurized fluid thereto, said piston having a first port, passage means communicating with said first port and providing a communication between said first compartment and a region of lower pressure externally of said wall structure, means for exhausting fluid from said second compartment, said wall structure having a second port providing communication between said cavity and said second compartment, means defining a restricted orifice between said cavity and said conduit structure, a cup valve disposed in said second compartment in covering relation with said second port, a compression spring interposed between said piston and said cup valve and urging the latter toward said second port, a pilot valve disposed in covering relation with said first port, said pilot valve being of smaller cross-sectional area than said cup valve, and means including a movable member operatively associated with said pilot valve and effective to positively position said pilot valve towards or away from said first port in accordance with the position of said movable member, said piston being movable with a following action relative to said pilot valve by the fluid pressure in said first compartment to vary the spring bias on said cup valve, and second conduit structure disposed in communication with said cavity and said second port, said cup valve being effective to modify the fluid pressure in said second conduit in accordance with the position of said movable member.

2. A pressure regulating device comprising a cam member, means for positioning said cam member, a follower operatively associated with said cam member, wall structure having an internal cylindrical chamber, a piston slidably disposed in said chamber and dividing said chamber into first and second compartments, first conduit structure disposed in always open communication with said first and second compartments for admitting a pressurized fluid thereto, said wall structure having a first port providing a part of the communication between said conduit structure and said second compartment, a main cup valve disposed in said second compartment in covering relation with said port, a spring member interposed between said piston and said cup valve and urging the latter toward said port, means defining a second port, passage means communicating with said second port and providing a communication between said first compartment and a region of lower pressure externally of said wall structure, a pilot cup valve disposed in covering relation with said second port, said main cup valve being of larger cross-section than said pilot cup valve, said follower having a portion operatively associated with said pilot valve and effective to position said pilot valve towards or away from said second port in accordance with the position of said cam, means for venting said second compartment to a region of lower pressure externally of said wall structure, and second conduit structure disposed in restricted communication with said first conduit structure and unrestricted communication with said second port, said main cup valve being effective to modify the pressure of the pressurized fluid in said second conduit in accordance with the position of said follower on said cam.

3. A pressure regulating device comprising a cam member, means for positioning said cam member, a follower operatively associated with said cam member, wall structure having an internal cylindrical chamber, a relay piston slidably disposed in said chamber and dividing said chamber into first and second compartments, first conduit structure disposed in always open communication with said first and second compartments for admitting a pressurized fluid thereto, said piston having a first port passage means communicating with said first port and providing a communication between said first compartment and a region of lower pressure externally of said wall structure, said wall structure having a second port providing a part of the communication between said conduit structure and said second compartment, means for exhausting fluid from said second compartment, means defining a restricted orifice between said second port and said conduit structure, a main cup valve disposed in said second compartment in covering relation with said second port, a pilot cup valve disposed in covering relation with said first port, a compression spring interposed between said piston and said main cup valve and urging the latter toward said second port, said follower having a portion operatively associated with said pilot cup valve and effective to position said pilot cup valve towards or away from said first port in accordance with the position of said cam, said piston being movable with a following action relative to said pilot valve by the fluid pressure in said first compartment to vary the spring bias on said main cup valve, and second conduit structure disposed in restricted communication with said first conduit structure and unrestricted communication with said second port, said main cup valve being effective to modify the fluid pressure in said second conduit in accordance with the position of said follower on said cam.

4. In control apparatus for a turbine having a positionable valve member for regulating admission of elastic motive fluid thereto, a fluid actuated servo-motor having a cylinder with an actuating piston therein, said piston being operatively connected to said valve, and a pressure responsive device for controlling the admission and exhaust of pressurized fluid to and from said cylinder; the improvement comprising an abutment in said pressure responsive device movable in response to the difference in pressure between a first regulated pressure signal and a second regulated pressure signal, said first pressure signal varying rectilinearly with rotational speed of a turbine, and said second pressure signal varying non-rectilinearly with the position of a valve, a pressure regulating device for providing said second pressure signal, and means operatively associated with said actuating piston and said pressure regulating device for actuating said pressure regulating device in accordance with the position of said piston.

5. In control apparatus for a turbine having a movable valve for regulating admission of elastic motive fluid thereto, a fluid actuated servo-motor having a cylinder with an actuating piston therein, said piston being operatively connected to said valve, and a pressure responsive device for controlling the admission and exhaust of pressurized fluid to and from said cylinder; the improvement comprising an abutment disposed in said device and movable in response to the difference in pressure between a first regulated pressure signal and a second regulated pressure signal, said first regulated pressure signal varying rectilinearly with rotational speed of a turbine and said second regulated pressure signal varying non-rectilinearly with the position of a movable valve, a pressure regulating device for providing said second pressure signal comprising wall structure having an internal cylindrical chamber, a relay member movably disposed in said chamber and dividing said chamber into first and second compartments, said wall structure further providing a cavity, first conduit structure for admitting a pressurized fluid to said first compartment and to said cavity, said wall structure having a first port providing communication between said cavity and said second compartment, a cup valve disposed in said second compartment in covering relation with said port, means defining a second port providing a communication between said first compartment and a region of lower pressure externally of said wall structure, a pilot valve disposed in covering relation with said second port, means including a movable member operatively associated with said pilot valve and said actuating piston and effective to position said pilot valve towards or away from said second port in accordance with the position of said actuating piston, a spring member interposed between said relay member and said cup valve, and second conduit structure disposed in communication with said cavity and in restricted communication with said first conduit structure, said cup valve being effective to modify the pressure of the pressurized fluid in said second conduit to provide said second pressure signal in accordance with the position of said movable member, and said second conduit being arranged to transmit said second pressure signal to said movable abutment.

6. In control apparatus for a turbine having a movable admission valve for regulating admission of elastic motive fluid thereto, a fluid actuated servo-motor having a cylinder with an actuating piston therein, said piston being operatively connected to said valve, and a pressure responsive device for controlling the admission and exhaust of pressurized fluid to and from said cylinder in response to a first regulated pressure signal varying rectilinearly with rotational speed of said turbine; the improvement comprising an abutment disposed in said device and movable in response to the difference in presure between said first regulated pressure signal and a second regulated pressure signal, said second regulated pressure signal varying non-rectilinearly with the position of a movable valve, a pressure regulating device for providing said second pressure signal comprising a cam member, means for positioning said cam member in accordance with the position of an admission valve, a follower operatively associated with said cam member, wall structure including first and second portions defining an internal cylindrical chamber, a relay piston slidably disposed in said chamber and dividing said chamber into first and second compartments, first conduit structure for admitting a pressurized fluid to said first and second compartments, one of said portions having a first port providing communication between said conduit structure and said second compartment, means defining a restricted orifice between said conduit structure and said second compartment, a cup valve disposed in said second compartment in covering relation with said port, said relay piston having a second port providing a communication between said first compartment and a region of lower pressure externally of said wall structure, a pilot valve slidably received in the other of said portions and disposed in covering relation with said second port, said pilot valve being of smaller cross-sectional area than said cup valve, said follower having a portion operatively associated with said pilot valve and effective to position said pilot valve towards or away from said second port in accordance with the position of said cam, a compression spring member disposed in said second compartment and interposed between said relay piston and said cup valve, means for venting said second chamber to a region of lower pressure externally of said wall structure, and second conduit structure disposed in restricted communication with said first conduit structure and unrestricted communication with said first port, said cup valve being effective to modify the pressure of the pressurized fluid in said second conduit to provide said second pressure signal in accordance with the position of said follower on said cam, and said second conduit being arranged to transmit said second pressure signal to said movable abutment.

References Cited in the file of this patent

UNITED STATES PATENTS

| | | |
|---|---|---|
| 1,524,450 | Nicholson | Jan. 27, 1925 |
| 1,606,871 | Flanders | Nov. 16, 1926 |
| 1,887,536 | Baumann | Nov. 15, 1932 |
| 2,237,118 | Schwendner | Apr. 1, 1941 |
| 2,345,297 | Schwendner | Mar. 28, 1944 |
| 2,472,896 | Gottlieb | June 14, 1949 |
| 2,484,557 | Eckman | Oct. 11, 1949 |
| 2,621,301 | Schwendner | Dec. 5, 1952 |
| 2,668,556 | Meyer | Feb. 9, 1954 |
| 2,788,800 | Towler et al. | Apr. 16, 1957 |
| 2,974,639 | O'Conner et al. | Mar. 14, 1961 |
| 2,990,850 | Cook | July 4, 1961 |

FOREIGN PATENTS

| | | |
|---|---|---|
| 988,050 | France | Apr. 25, 1951 |